US006182696B1

(12) United States Patent
Rainwater et al.

(10) Patent No.: US 6,182,696 B1
(45) Date of Patent: Feb. 6, 2001

(54) DUAL ISOLATION VALVE WITH RECTANGULAR FLOW PASSAGEWAYS

(75) Inventors: Edward L. Rainwater, Quitman; Ricky E. Spears, Sulphur Springs, both of TX (US)

(73) Assignee: Nordstrom Valves, Inc., Sulphur Springs, TX (US)

( * ) Notice: Under 35 U.S.C. 154(b), the term of this patent shall be extended for 0 days.

(21) Appl. No.: 09/179,622

(22) Filed: Oct. 27, 1998

(51) Int. Cl.[7] ...................................................... F16K 5/08
(52) U.S. Cl. ...................................... 137/614.21; 137/613
(58) Field of Search .............................. 137/613, 614.21

(56) References Cited

U.S. PATENT DOCUMENTS

| 2,024,905 | * | 12/1935 | Bard ..................................... 251/121 |
| 2,058,747 | * | 10/1936 | Wilkins .................................. 251/93 |
| 3,896,857 |   | 7/1975  | Turner et al. ........................ 137/628 |

(List continued on next page.)

FOREIGN PATENT DOCUMENTS

| 0 565 243 A1 | 10/1993 | (EP) ................................ F16K/5/22 |
| 829293       | 3/1960  | (GB) . |
| 850297       | 10/1960 | (GB) . |

(List continued on next page.)

OTHER PUBLICATIONS

*Specification for Pipeline Valves (Gate, Plug, Ball and Check Valves)* API Specification 6D (Spec 6D) Twenty–First Edition, Mar. 31, 1994.
*Taper Plug Valves Pressure Balance Design*; Christensens Valves (Brochure).
*Lubricated Taper Plug Valves*; Product Group; 9 Catalogue No. 184 (Brochure).

(List continued on next page.)

*Primary Examiner*—Denise L. Ferensic
*Assistant Examiner*—Joanne Y. Kim
(74) *Attorney, Agent, or Firm*—Myers Bigel Sibley & Sajovec

(57) ABSTRACT

A dual isolation valve comprises: a valve body with opposed inlet and outlet ports that defines an inner cavity; a first valve member; and a second valve member. The first valve member (preferably a plug) has a narrower first end and a wider second end and is rotatably mounted within the valve body cavity for rotation about a first axis of rotation substantially perpendicular to the flow axis defined by the inlet and outlet ports. The first valve member includes a substantially rectangular flow passage. The first end of the first valve member extends away from the second end along the first axis of rotation in a first direction, and the first valve member is rotatable between an open position, in which the flow passage is oriented to be generally aligned with and located on the flow axis to enable fluid entering the inlet port to pass through the flow passage, and a closed position, in which the flow passage is oriented to be generally perpendicular to the flow axis to prevent fluid entering the inlet port from passing through the flow passage. The second valve member also has a narrower first end and a wider second end and is rotatably mounted within the valve body cavity for rotation about a second axis of rotation substantially perpendicular to the flow axis. The first end of the second valve member extends away from the second end along the second axis of rotation in a second direction opposite the first direction (such that the first and second valve members are oriented in opposed directions). The second valve member, which also has a substantially rectangular flow passage, is rotatable between an open position, in which the flow passage is oriented to be generally aligned with and located on the flow axis to enable fluid exiting the first valve member to pass through the flow passage to the outlet port, and a closed position, in which the flow passage is oriented to be generally perpendicular to the flow axis to prevent fluid exiting the first valve member from passing through the flow passage to the outlet port. In this configuration, the flow of fluid through valve can be disturbed less than with prior art dual isolation valves while permitting extensive flow through the valve.

10 Claims, 4 Drawing Sheets

U.S. PATENT DOCUMENTS

| | | | |
|---|---|---|---|
| 4,215,847 | 8/1980 | Hoos | 251/317 |
| 4,275,763 * | 6/1981 | Fahrig | 137/613 |
| 4,276,905 * | 7/1981 | Lourdeaux | 137/613 |
| 4,498,498 * | 2/1985 | Martinez-Vera et al. | 137/613 |
| 4,529,168 | 7/1985 | Timmermans | 251/210 |
| 4,846,212 | 7/1989 | Scobie et al. | 137/240 |
| 4,884,401 | 12/1989 | Metcalf et al. | 60/403 |
| 5,669,415 | 9/1997 | Trunk | 137/613 |
| 5,685,338 | 11/1997 | Trunk | 137/613 |

FOREIGN PATENT DOCUMENTS

| | | | |
|---|---|---|---|
| 915446 | 1/1963 | (GB) | . |
| 918020 | 2/1963 | (GB) | . |
| 1 369 885 | 10/1974 | (GB) | F16K/5/22 |
| 2 131 129 | 6/1984 | (GB) | F16K/3/00 |
| 2 300 693 | 11/1996 | (GB) | F16K/39/06 |
| 2 305 713 | 4/1997 | (GB) | F16K/27/06 |
| 2 305 713 | 11/1997 | (GB) | F16K/27/06 |
| 50-64018 | 6/1975 | (JP) | F16K/5/06 |
| 54-146932 | 10/1979 | (JP) | F16K/5/00 |
| 55-88487 | 6/1980 | (JP) | E03C/1/042 |
| 56-63178 | 5/1981 | (JP) | F16K/35/14 |
| 58-160672 | 11/1982 | (JP) | F16K/5/22 |
| WO 84/00795 | 3/1984 | (WO) | F16K/31/44 |
| WO 97/13085 | 4/1997 | (WO) | F16K/27/06 |

OTHER PUBLICATIONS

*AZ Special Plug Valves With Flushing Device*; AZ Armaturen (Brochure).

*Nordstrom Steel Plug Valves*; Nordstrom Valves, Inc. V–102–R2A (Brochures).

*Super–H Pressure Balanced Plug Valve*; Serck Audco Valves (Brochures).

Extracts from Advanced Products Catalogue Showing "C" Ring as a proprietary item.

*Double isolation valve wins on safety and savings*; Valvetalk (Spring 1998).

International Search Report for PCT/US 99/19957, mailed 10/12/99.

API, *Specification for Pipeline Valves (Gate, Plug, Ball, and Check Valves)*, API Specification 6D, Twenty–First Edition, 03/31/94.

API, *Specification for Pipeline Valves (Gate, Plug, Ball, and Check Valves)*, API Specification 6D, Twenty–First Edition, 03/31/94, Supplement 1 (December 1, 1996).

* cited by examiner

DUAL ISOLATION VALVE WITH RECTANGULAR FLOW PASSAGEWAYS

FIELD OF THE INVENTION

The present invention relates generally to valves, and relates more specifically to dual-isolation valves.

BACKGROUND OF THE INVENTION

Valves are common components of almost any piping system. Although they can be constructed in many different configurations and sizes, a typical valve will include a few basic elements. These include: a valve body that houses internal components within an internal cavity; inlet and outlet ports leading to and from the valve body; one or more valve members positioned within the cavity of the valve body with passageways for fluid flow; inlet and outlet seats that seal the contact points between the inlet and outlet ports and the valve member(s); and a valve stem or other structure or mechanism that extends outside the cavity for turning the valve member(s) within the valve body cavity. These components are attached such that fluid entering the valve through the inlet pipe is either allowed to flow through the valve member to the outlet pipe or prevented from such flow based on the orientation of the valve member passageway relative to the valve body.

One specialized valve configuration is the "dual isolation" valve (sometimes also referred to as a "double block-and-bleed" valve), which includes a pair of valve members positioned in series within the valve cavity. Dual isolation valves are typically employed in piping systems in which any leakage through the valve when closed would be extremely detrimental, if not catastrophic. Exemplary uses include situations in which (a) two very volatile materials are separated by the valve, (b) a downstream operator is protected by the valve, (c) cross-contaminination of two materials is prevented by the valve, and (d) potable and nonpotable water streams are separated by the valve.

An example of a dual isolation valve is illustrated in U.S. Pat. No. 5,669,415 to Trunk (the Trunk valve). The Trunk valve has two frustoconical plugs, each of which is inverted (i.e., the narrower end of the plug extends upwardly). Of course, the volumetric flow of the valve is dependent on the size and shape of passageways in the plugs; however, the size of the passageways is limited by the size of the plug itself, as sufficient structure must surround the passageway to prevent the plug from fracturing or collapsing during use. Typically, and as illustrated in Trunk, valves having frustoconical plugs include trapezoidal flow passageways in the plugs that match the trapezoidal cross-sectional shape of the plugs in an effort to maximize the cross-sectional surface area of the passageway.

Some dual isolation valves having two frustoconical plugs are configured such that one plug is inverted as described above and the other is not (i.e., the narrower end of the plug extends downwardly). This configuration (exemplified in British Patent No. GB 2 305 713 B) is employed in an attempt to reduce the cavity volume and overall length of the valve; because the plugs are oriented 180 degrees apart about the flow axis, they can be positioned closer together without interfering with one another than is the case for identically oriented plugs.

Unfortunately, the reverse orientation of one plug within a dual isolation valve can create reduction in volumetric flow when trapezoidal cross-section flow passageways are employed. Because the perimeters of the flow passageways are not aligned with each other (as can be the case for dual isolation valves like the Trunk valve), a fluid flowing through the valve is redirected somewhat from its flow path, thereby increasing the turbulence in the flow and reducing flow efficiency. This shortcoming has led to some valves having aligned circular flow passageways; however, such passageways provide less cross-sectional area for flow and, thus, also suffer from reduced volumetric flow.

SUMMARY OF THE INVENTION

In view of the foregoing, it is an object of the present invention to provide a dual isolation valve with plugs that are oriented 180 degrees apart from each other about the flow axis, but which do not suffer from considerably reduced volumetric flow.

It is also an object of the present invention to provide such a valve with high flow efficiency.

These and other objects are satisfied by the present invention, which is directed to a dual isolation valve with improved flow characteristics. The dual isolation valve comprises: a valve body with opposed inlet and outlet ports that defines an inner cavity; a first valve member; and a second valve member. The first valve member (preferably a frustoconical plug) has a narrower first end and a wider second end and is rotatably mounted within the valve body cavity for rotation about a first axis of rotation substantially perpendicular to the flow axis defined by the inlet and outlet ports. The first valve member includes a substantially rectangular flow passage. The first end of the first valve member extends away from the second end along the first axis of rotation in a first direction, and the first valve member is rotatable between an open position, in which the flow passage is oriented to be generally aligned with and located on the flow axis to enable fluid entering the inlet port to pass through the flow passage, and a closed position, in which the flow passage is oriented to be generally perpendicular to the flow axis to prevent fluid entering the inlet port from passing through the flow passage. The second valve member also has a narrower first end and a wider second end and is rotatably mounted within the valve body cavity for rotation about a second axis of rotation substantially perpendicular to the flow axis. The first end of the second valve member extends away from the second end along the second axis of rotation in a second direction opposite the first direction (such that the first and second valve members are oriented in opposed directions). The second valve member, which also has a substantially rectangular flow passage, is rotatable between an open position, in which the flow passage is oriented to be generally aligned with and located on the flow axis to enable fluid exiting the first valve member to pass through the flow passage to the outlet port, and a closed position, in which the flow passage is oriented to be generally perpendicular to the flow axis to prevent fluid exiting the first valve member from passing through the flow passage to the outlet port. In this configuration, the flow of fluid through valve can be disturbed less than with prior art dual isolation valves while permitting extensive flow through the valve.

In a preferred embodiment, the flow passageways are constructed such that their perimeters are substantially aligned along the flow axis. In this configuration, fluid flow is typically disturbed no more than for prior art valves having circular passageways; however, the volume of flow can be greater than for circular passageway valves because the rectangular shape of the passageways permits greater flow volume.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
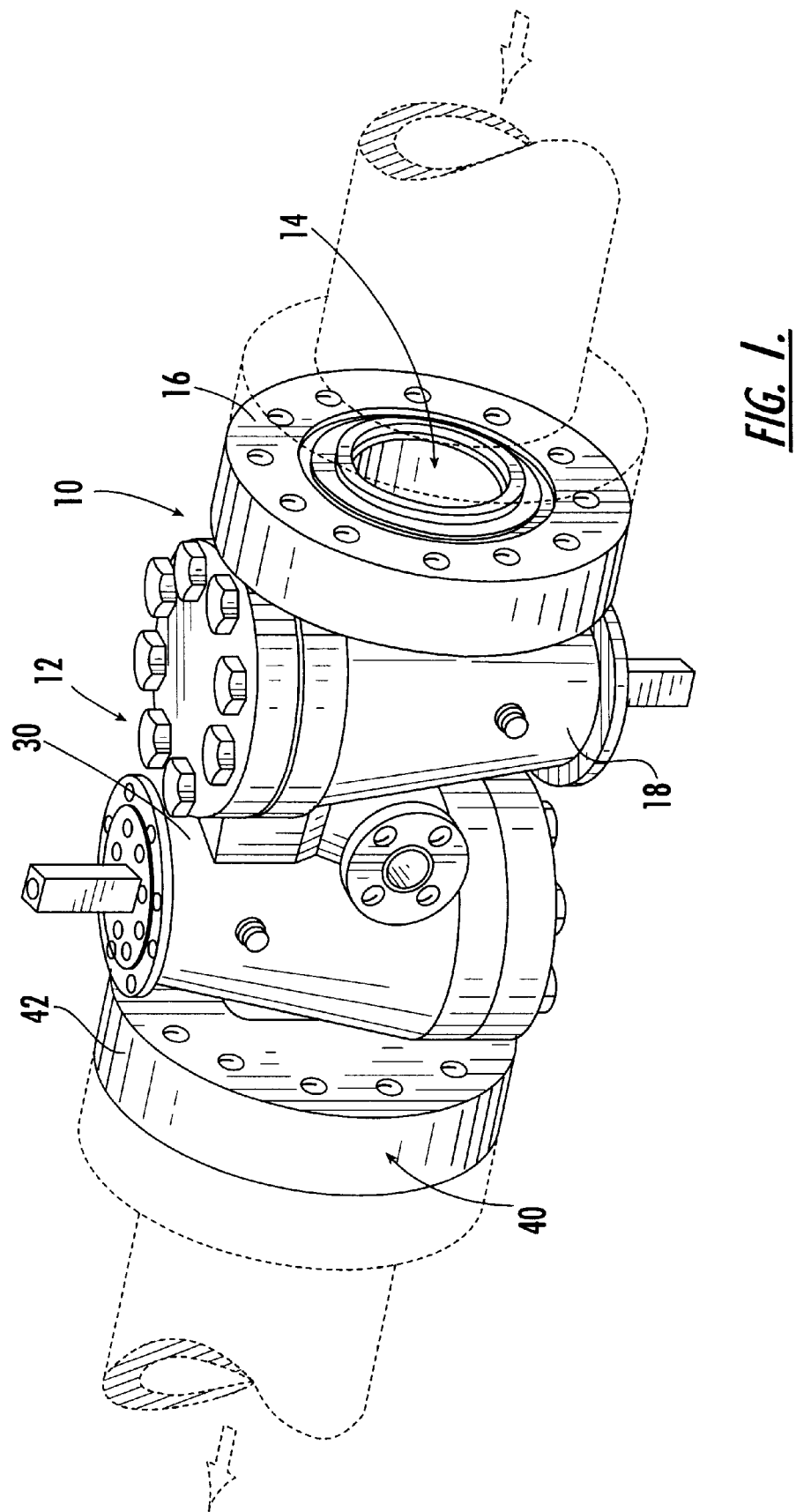
FIG. 1 is a perspective view of a dual isolation valve of the present invention.

Referring now to the drawings, a dual isolation valve, designated broadly at 10, is illustrated in FIG. 1. The valve 10 includes a housing 12 having an inlet port 14 at one end and an outlet port 40 at the opposite end. An inlet flange 16 is fixed to the free end of the inlet port 14 to facilitate attachment of the valve 10 within a piping system; similarly, an outlet flange 42 is fixed to the free end of the outlet port 40.

Figure 2:
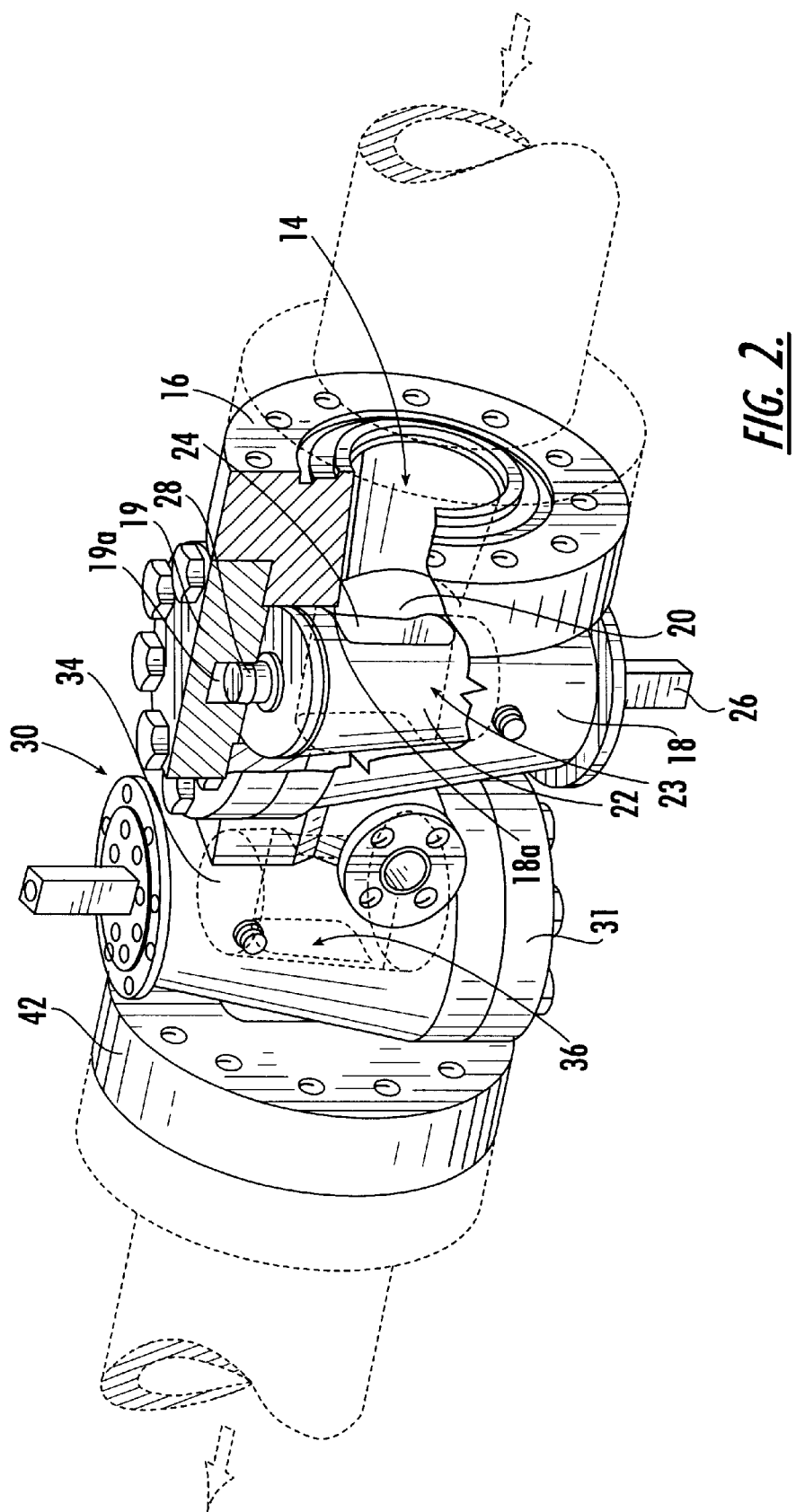
FIG. 2 is a perspective cutaway view of the dual isolation valve of FIG. 1.
Figure 3:
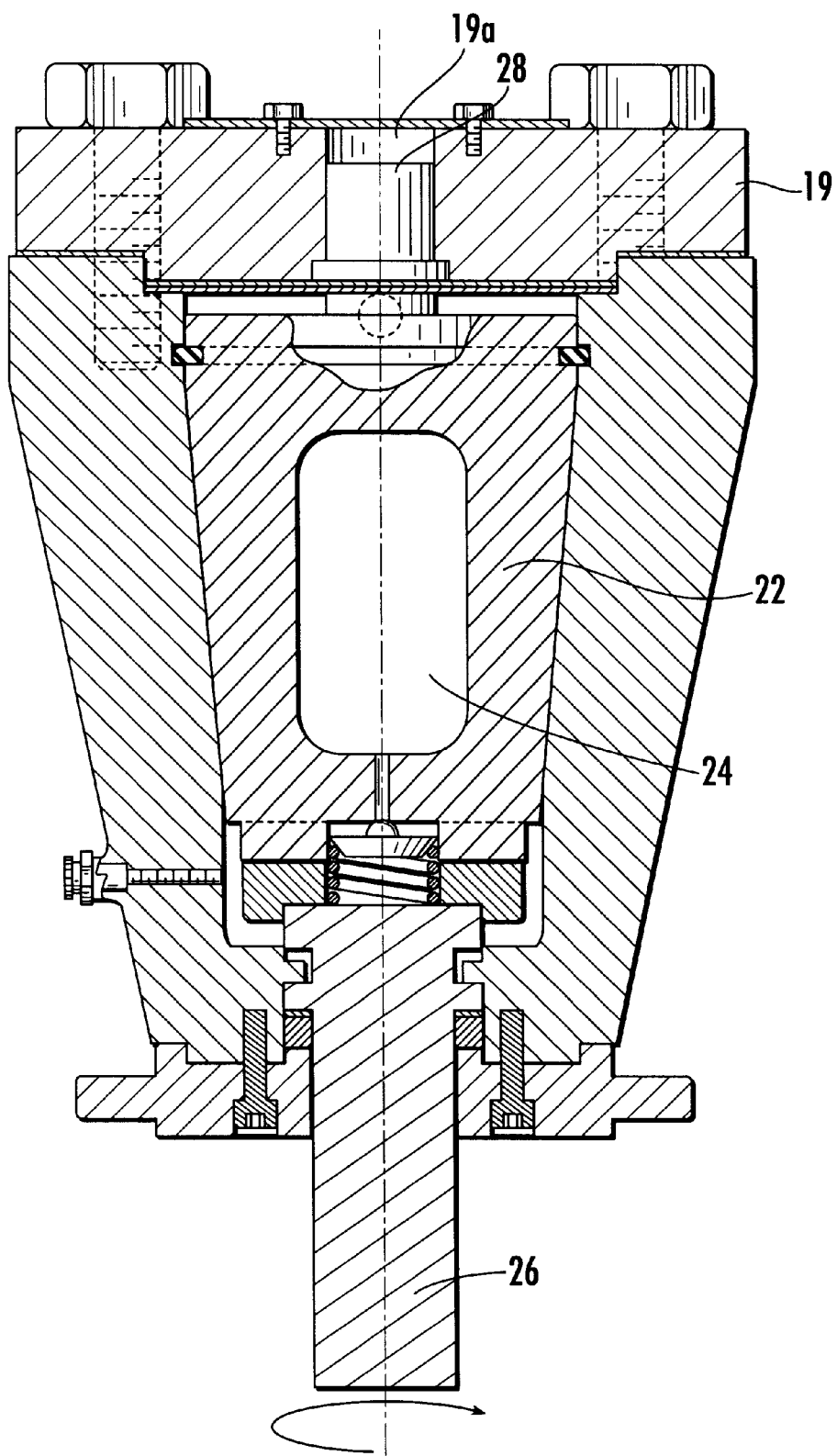
FIG. 3 is a section view through the inverted valve section of the dual isolation valve of FIG. 1.
Figure 4:
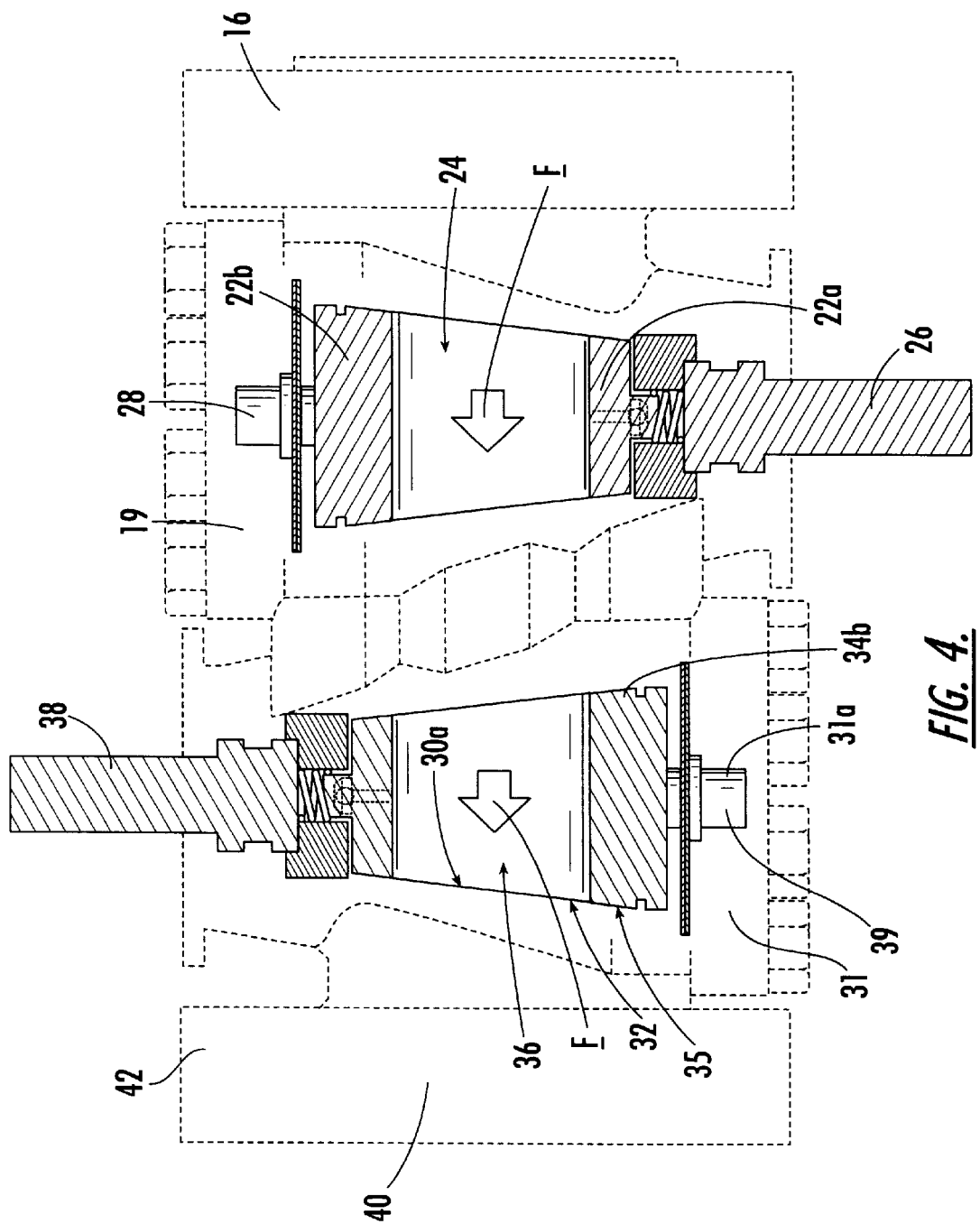
FIG. 4 is a section view through the both the upright and inverted valve sections of the dual isolation valve of FIG. 1.

Referring now to FIGS. 2 through 4, the housing 12 (shown in cross-section) includes an inverted valve section 18 and an upright valve section 30 which house, respectively, an inverted plug 22 and an upright plug 34. The inverted valve section 18 includes an internal surface 18a having an open upper end. A cover assembly 19 covers the inverted valve section 18 and, with the internal surface 18a, defines a cavity 20.

The plug 22 (typically formed of iron, steel, ceramic, plastic or a composite material) has a frustoconical shape and is positioned within the cavity 20 such that its narrower end 22a extends downwardly and its wider end 22b extends upwardly. Typically, the plug 22 has a length to diameter ratio of between about 1.0 and 5.0, and a taper of between 3 and 7 degrees, with about 4–5 degrees being preferred. The outer surface 23 of the plug 22 contacts, nests within, and forms a seal with the internal surface 18a of the inverted valve section 18. The seal between the plug 22 and the internal surface 18 is preferably augmented with a sealant, such as a "Bingham-type" fluid, the composition of which is tailored to enhance the sealing performance of the valve while ensuring compatibility with the line media.

The plug 22 includes a substantially rectangular passageway 24, which enables fluid to pass from the inlet port 14 to the upright valve section 30 along a flow axis F. Preferably, the passageway 24 has a length (i.e., long axis) to width (i.e., short axis) ratio of between about 1.0 and 5.0.

A stem 26 is fixed to the narrow end of the plug 22 and extends through an aperture in the inverted valve section 18 to provide access to an operator to rotate the plug 22. Illustratively, the stem 26 is square in cross-section to mate with a similarly shaped wrench; however, other configurations for the stem 26 (such as hexagonal) may be employed, as may more complex valve member rotation mechanisms, such as that described in British Patent GB2305713B. At its wider end, the plug 22 includes a adjusting screw 28 that extends into and mates with a round recess 19a in the cap 19.

Referring again to FIGS. 2 through 4, the internal surface 30a of the upright valve section 30, along with a cover assembly 31 attached to its lower portion, define a cavity 32. Within the cavity 32, a frustoconical plug 34 is rotatably mounted and seated in similar fashion to the plug 22, with the outer surface 35 of the plug 34 contacting the internal surface 30a. The plug 34 is oriented such that it is oriented about the flow axis F 180° from the plug 22; i.e., its narrower end 34a extends upwardly and its lower end 34b extends downwardly. The preferred dimensions set forth above for the plug 22 are equally applicable for the plug 30.

The plug 34 includes a rectangular passageway 36. Illustratively and preferably, the passageway 36 should be sized to be substantially the same in crosssection as the passageway 24, and its perimeter should be substantially aligned with the perimeter of the passageway 24 relative to the flow axis F. Like the plug 22, the plug 34 also includes a stem 38 that extends through an aperture in the upright valve section 30 to enable operator access for rotating the plug 34, and further includes a adjusting screw 39 at its wider end 34a that extends into and mates with a recess 31a in the cap 31.

In operation, the valve 10 takes a closed position (i.e., one in which fluid is prevented from flowing from the inlet port 14 to the outlet port 40) by rotating the plugs 22, 34 to their closed positions. This is performed by using a wrench or other tool to rotate the stems 26, 38 counterclockwise. Such rotation causes each plug to be oriented about its axis of rotation so that its respective passageway 24, 36 is substantially perpendicular to the flow axis F. In this position, the outer surfaces 23, 35 of the plugs 22, 34 contact the internal surfaces 18a, 30a, thereby sealing the inlet and outlet ports 14, 40 from each other.

In the closed position, the valve 10 has two plugs positioned to prevent fluid flow from the inlet port 14 to the outlet port 40. Thus, if some degree of leakage occurs through the seal between the plug 22 and the internal surface 18a (such as by erosion or misalignment of the plug 22, or by inadvertent opening of the plug 22), the interaction between the plug 34 and the internal surface 30a provides a back-up seal that can prevent fluid flow to the outlet port 40.

The valve 10 can be opened by rotating each valve stem 26, 38 clockwise onequarter turn (90 degrees) around its axis of rotation. Such rotation drives each plug 22, 34 to a position in which its respective passageway 24, 36 is oriented to be substantially parallel to the flow axis F. As such, fluid is then free to flow from the inlet port 14 through the passageways 24, 36 and into the outlet port 40.

As shown in FIGS. 3 and 4, rotation of the plugs 22, 34 to their open positions causes the passageways 24, 36 to be positioned such that their perimeters are substantially aligned along the flow axis F. As a result, fluid flowing through the passageways 24, 36 is not substantially diverted from its flow path in order to pass therethrough. Accordingly, the volumetric flow rate of the valve 10 is not reduced due to the creation of turbulence caused by the misalignment of plug passageways that occurs in other "reverse orientation" dual isolation plug valves.

In addition, the rectangular shape of the passageways 24, 36 increases the cross-sectional area available for flow. As such, the volumetric flow rate of the valve 10 is greater than would be the case for a circular passageway having a diameter equal to the length or width of a rectangular passageway such as that illustrated and described herein. Of course, the plugs 22, 34 may be operated independently of one another, so that the valve 10 may be used as a single plug valve with a redundant plug.

The foregoing is illustrative of the present invention and is not to be construed as limiting thereof Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. In the claims, means-plus-function clauses are intended to cover the structures described herein as perfonning the recited function and not only structural equivalents but also equivalent structures.

What is claimed is:

1. A dual isolation valve, comprising:

a valve body with opposed inlet and outlet ports, said valve body defining an inner cavity, and said inlet and outlet ports defining a flow axis extending therebetween;

a first valve member having a narrower first end and a wider second end and being rotatably mounted within said cavity for rotation about a first axis of rotation substantially perpendicular to said flow axis, with said first end extending away from said second end along said first axis of rotation in a first direction, said first valve member having a substantially rectangular flow passage, said first valve member being rotatable between an open position, in which said flow passage is oriented to be generally aligned with and located on said flow axis to enable fluid entering said inlet port to pass through said flow passage, and a closed position, in which said flow passage is oriented to be generally perpendicular to said flow axis to prevent fluid entering said inlet port from passing through said flow passage;

a second valve member having a narrower first end and a wider second end and being rotatably mounted within said cavity for rotation about a second axis of rotation substantially perpendicular to said flow axis, with said first end extending away from said second end along said second axis of rotation in a second direction opposite said first direction, said second valve member having a substantially rectangular flow passage, said second valve member being rotatable between an open position, in which said flow passage is oriented to be generally aligned with and located on said flow axis to enable fluid exiting said first valve member to pass through said flow passage to said outlet port, and a closed position, in which said flow passage is oriented to be generally perpendicular to said flow axis to prevent fluid exiting said first valve member from passing through said flow passage to said outlet port.

2. The valve defined in claim 1, wherein said rectangular flow passage of said first valve member is oriented such that the long axis of the rectangle defined by said flow passage is substantially parallel with the first axis of rotation, and wherein said rectangular flow passage of said second valve member is oriented such that the long axis of the rectangle defined by said flow passage is substantially parallel with the second axis of rotation.

3. The valve defined in claim 1, wherein each of said rectangular passages has a perimeter, said perimeters of said rectangular passages define a length and a width, and a ratio of said length to said width is between about 1.0 and 5.0.

4. The valve defined in claim 1, wherein said first and second valve members are formed of one of iron, steel, ceramic or a composite material.

5. The valve defined in claim 1, wherein each of said first and second valve members is frustoconical in shape.

6. A dual isolation valve, comprising:

a valve body with opposed inlet and outlet ports, said valve body defining an inner cavity, and said inlet and outlet ports defining a flow axis extending therebetween;

a first valve member having a narrower first end and a wider second end and being rotatably mounted within said cavity for rotation about a first axis of rotation substantially perpendicular to said flow axis, with said first end extending away from said second end along said first axis of rotation in a first direction, said first valve member having a substantially rectangular flow passage, said first valve member being rotatable between an open position, in which said flow passage is oriented to be generally aligned with and located on said flow axis to enable fluid entering said inlet port to pass through said flow passage, and a closed position, in which said flow passage is oriented to be generally perpendicular to said flow axis to prevent fluid entering said inlet port from passing through said flow passage;

a second valve member having a narrower first end and a wider second end and being rotatably mounted within said cavity for rotation about a second axis of rotation substantially perpendicular to said flow axis, with said first end extending away from said second end along said second axis of rotation in a second direction opposite said first direction, said second valve member having a substantially rectangular flow passage, said second valve member being rotatable between an open position, in which said flow passage is oriented to be generally aligned with and located on said flow axis to enable fluid exiting said first valve member to pass through said flow passage to said outlet port, and a dosed position, in which said flow passage is oriented to be generally perpendicular to said flow axis to prevent fluid exiting said first valve member from passing through said flow passage to said outlet port;

wherein each of said flow passages of said first and second valve members defines a substantially rectangular perimeter, and wherein said substantially rectangular perimeters are substantially aligned along said flow axis.

7. The valve defined in claim 6, wherein said rectangular flow passage of said first valve member is oriented such that the long axis of the rectangle defined by said flow passage is substantially parallel with the first axis of rotation, and wherein said rectangular flow passage of said second valve member is oriented such that the long axis of the rectangle defined by said flow passage is substantially parallel with the second axis of rotation.

8. The valve defined in Claim 6, wherein each of said perimeters of said rectangular passages defines a length and a width, and a ratio of said length to said width is between about 1.0 and 5.0.

9. The valve defined in claim 6, wherein said first and second valve members are formed of one of iron, steel, ceramic, or a composite material.

10. The valve defined in claim 6, wherein each of said first and second valve members is frustoconical in shape.

* * * * *